(12) United States Patent
Neu et al.

(10) Patent No.: US 10,576,801 B2
(45) Date of Patent: Mar. 3, 2020

(54) TRANSVERSE CONTROL ARM

(71) Applicant: ZF Friedrichshafen AG, Friedrichshafen (DE)

(72) Inventors: Alexander Neu, Friedrichshafen (DE); Knut Heidsieck, Bünde (DE); Peter Kontermann, Osnabrück (DE); Holger Lohmüller, Belm (DE); Nils Mühl, Friedrichshafen (DE); Philipp Grevemeyer, Osnabrück (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/576,888

(22) PCT Filed: Apr. 25, 2016

(86) PCT No.: PCT/EP2016/059152
§ 371 (c)(1),
(2) Date: Nov. 27, 2017

(87) PCT Pub. No.: WO2016/188685
PCT Pub. Date: Dec. 1, 2016

(65) Prior Publication Data
US 2018/0147903 A1 May 31, 2018

(30) Foreign Application Priority Data
May 28, 2015 (DE) .................. 10 2015 209 845

(51) Int. Cl.
*B60G 7/00* (2006.01)
(52) U.S. Cl.
CPC .................... *B60G 7/001* (2013.01)

(58) Field of Classification Search
CPC ............. B60G 7/001; B60G 2206/124; B60G 2206/12; B60G 2200/44; B60G 2204/143; B62D 7/06
See application file for complete search history.

(56) References Cited

U.S. PATENT DOCUMENTS 2,872,206 A  2/1959 Cislo
5,004,061 A  4/1991 Andruet
(Continued)

FOREIGN PATENT DOCUMENTS

DE   101 10 492 A1   9/2002
EP    0 345 123 A1  12/1989
(Continued)

OTHER PUBLICATIONS

International Search Report Corresponding to PCT/EP2016/059152 dated Jun. 30, 2016.
(Continued)

*Primary Examiner* — Drew J Brown
(74) *Attorney, Agent, or Firm* — Davis & Bujold PLLC; Michael J. Bujold

(57) ABSTRACT

A transverse control arm (1) of an axle arrangement for a vehicle having two transverse control arm struts (2, 3) and at least three kinematics points (4, 5, 6). Each of the two transverse control arm struts (2, 3) has a carrier hub end (9) and a carriage end (10). At least one of the two transverse control arm struts (2, 3) has a curvature (7) in a spatial direction, and this spatial direction being along a vertical axis that extends generally perpendicular relative to the plane defined by the at least three kinematic points (4, 5, 6).

12 Claims, 1 Drawing Sheet

(56) References Cited

U.S. PATENT DOCUMENTS

| | | | |
|---|---|---|---|
| 5,310,211 A * | 5/1994 | DelBeke | B60G 7/001 280/124.134 |
| 5,782,484 A | 7/1998 | Kuhn, Jr. | |
| 5,820,150 A | 10/1998 | Archer et al. | |
| 6,116,627 A * | 9/2000 | Kawabe | B60G 3/20 280/124.1 |
| 6,305,699 B1 * | 10/2001 | Konig | B60G 7/001 280/124.133 |
| 6,719,314 B1 | 4/2004 | Schote | |
| 6,793,030 B2 * | 9/2004 | Pyykonen | B62M 27/02 180/182 |
| 6,959,935 B2 * | 11/2005 | Buhl | B60G 7/001 180/352 |
| 2004/0108674 A1 | 6/2004 | McGaughy | |
| 2005/0110235 A1 * | 5/2005 | LeBlanc, Sr. | B60G 3/20 280/124.135 |
| 2005/0212244 A1 | 9/2005 | Bobbitt, III et al. | |
| 2006/0175105 A1 | 8/2006 | Kubota | |
| 2007/0170682 A1 * | 7/2007 | Kinugasa | B60G 3/20 280/124.135 |
| 2015/0183286 A1 | 7/2015 | Bruehl et al. | |
| 2016/0229251 A1 * | 8/2016 | Mori | B60G 13/003 |
| 2018/0154717 A1 * | 6/2018 | Neu | B60G 3/20 |

FOREIGN PATENT DOCUMENTS

| | | | |
|---|---|---|---|
| FR | 2882692 A1 * | 9/2006 | B60G 3/06 |
| GB | 2 333 576 A | 7/1999 | |
| JP | 01032911 A * | 2/1989 | B60G 3/20 |
| JP | 2001030941 A * | 2/2001 | |
| WO | 2013/185870 A1 | 12/2013 | |

OTHER PUBLICATIONS

Written Opinion Corresponding to PCT/EP2016/059152 dated Jun. 30, 2016.

* cited by examiner

TRANSVERSE CONTROL ARM

This application is a National Stage completion of PCT/EP2016/059152 filed Apr. 25, 2016, which claims priority from German patent application serial no. 10 2015 209 845.1 filed May 28, 2015.

FIELD OF THE INVENTION

The present invention relates to a transverse control arm of an axle assembly for a vehicle.

BACKGROUND OF THE INVENTION

In axle arrangements for novel mobility concepts permitting a steering angle of at least +/−50° to +/−90°, for instance, the suspension kinematics in comparison to conventional axle arrangements having maximum steering angles of +/−50° become more complex because additional components are required. Despite the additional necessary components in the axle assembly, the installation space available for the axle assembly remains the same. Therefore, an effective and optimized use of the available installation space is mandatory.

From DE 10110492 A1 a link, in particular a transverse control arm for a wheel suspension is known. It comprises two bearing elements and a single-shell connecting element joining the bearing elements. The connecting element comprises a web, which is formed as a plane and integral plate. The web also has an arcuate cranked basic shape.

Furthermore, axle arrangements are known in which cranked tension or compression struts are used as transverse control arms.

SUMMARY OF THE INVENTION

The present invention addresses the problem, based on the prior art, of providing an improved transverse control arm, which permits making use of the available installation space for an axle assembly as effectively and as well as possible. The transverse control arm should also be inexpensive to produce.

The present invention proposes, based on the problem outlined above, a transverse control arm of an axle assembly for a vehicle having the features of the independent claim(s). Further advantageous embodiments and developments are described in the dependent claims.

A transverse control arm of an axle assembly for a vehicle comprises two transverse control arm struts and at least three kinematic points. Each of the two transverse control arm struts has an end at the hub carrier and an end at the carriage. At least one of the two transverse control arm struts has a curvature in a spatial direction, this spatial direction being a vertical axis to a plane, which is spanned by the at least three kinematic points.

If the transverse control arm is used in an axle assembly of a vehicle, it is installed transversely to a direction of travel and connected to the hub carrier and for instance the carriage in an articulated manner. The axle assembly has further components, such as a tie rod, a spring strut or suspension strut, a hub carrier, a steering gear or a further suspension link. The transverse control arm according to the invention may be an upper transverse control arm or a lower transverse control arm of the axle assembly. As a matter of course, the axle assembly may also have two uniformly configured transverse control arms.

The transverse control arm has two, preferably mutually differently shaped, transverse control arm struts. A first of the two transverse control arm struts has an end at the hub carrier and at the carriage. A second of the two transverse control arm struts has an end at the hub carrier and at the carriage. The transverse control arm may therefore be shaped as a triangular transverse control arm. The end of a transverse control arm strut at the carriage is the end, which is supported on a vehicle carriage, for instance, if the transverse control arm is used in the axle assembly of a vehicle. The hub carrier end of a transverse control arm strut is the end, which is connected to the hub carrier of the axle assembly if the transverse control arm is used in the axle assembly of a vehicle. The numbering here and throughout the text only serves to facilitate differentiation and does not indicate any priority.

A kinematic point in this case is an area of the transverse control arm, at which this transverse control arm may be connected to other components of the axle assembly or the vehicle in an articulated manner, if the transverse control arm is used in the axle assembly of a vehicle. A transverse control arm strut is constrained by two kinematic points. In other words, a transverse control arm strut of the transverse control arm extends from a first kinematic point to a second kinematic point, wherein the first kinematic point is arranged on the carriage-end of the transverse control arm strut and the second kinematic point is arranged on the hub carrier end of the transverse control arm strut. The kinematic points on the carriage-ends of the two transverse control arm struts have the same orientation, i.e., the axes of rotation of the articulated bearings are parallel to or coaxial with each other. The kinematic points on the carriage ends of the two transverse control arm struts are located on the same plane in a design configuration. For instance, the kinematic points on the carriage ends of the two transverse control arm struts can be designed as swivel joints.

An articulated connection of two components denotes a connection of the two components by means of a joint permitting the two components to be rotated around at least one axis of rotation relative to each other. I.e., articulated connections around exactly one axis of rotation, around exactly two axes of rotation and around exactly three axes of rotation are possible. An articulated connection does not permit any translational movement of the two components relative to each other.

At least one of the two transverse control arm struts has a curvature in a spatial direction adapted to the installation space, this spatial direction is a vertical axis of a plane, which is spanned by the at least three kinematic points. The spatial direction shall be understood as the directional axes of a Cartesian coordinate system, i.e., x, y, and z axes. The kinematic points of the two transverse control arm struts span the plane. On this plane, the spatial direction, in which the at least one transverse control arm strut is curved, is for instance, perpendicular. In other words, the spatial direction is a vertical axis, e.g., the z-axis. For example, when using the transverse control arm in the axle assembly of a vehicle, the spatial direction in design configuration is perpendicular to a road surface.

A curved shape of the at least one transverse control arm strut having a maximum is defined as a curvature. This maximum has the greatest distance of all areas of the transverse control arm to the plane, which is spanned by the at least three kinematic points. This maximum also has the greatest distance of all areas of the transverse control arm to a road surface if the transverse control arm is employed in the axle assembly of a vehicle.

A curvature adapted to the installation space of the at least one transverse control arm strut is defined as a curvature that is configured with respect to an installation space available for an axle assembly of a vehicle such that no conflicts, e.g., contacts, with other components of the axle assembly occur, neither in the design configuration nor in a vehicle operating condition. Furthermore, the curvature adapted to the installation space does not result in losses with regard to the component stability and component kinematics of the transverse control arm. The curvature is designed in such a manner that a material-free area is created, through which further components of the axle assembly of a vehicle can be passed. Here the option of closely spacing the transverse control arm and at least one other component of the axle assembly of the vehicle is advantageous, resulting in a lower space requirement than is the case for a fully planarly designed transverse control arm.

According to one embodiment, the shaping of the curvature of the at least one transverse control arm strut is determined by the installation space requirement of a component of the axle arrangement, which is guided in a partial area below the curvature of the at least one transverse control arm strut. In other words, the curvature adapted to the installation space of the at least one transverse control arm strut spans a portion of the one component of the axle assembly. To this end, the material-free area created by the curvature of the at least one transverse control arm strut is dimensioned such that the component of the axle arrangement which is guided below the curvature adapted to the installation space of the at least one transverse control arm strut does not collide with the transverse control arm, even in a vehicle operating condition. Expressed differently, the shape of the curvature depends on the space requirement of that component or those components of the axle assembly of the vehicle in a vehicle operating state whose partial area is spanned by the curvature. In this case, a possible deflection of the component or the components, for instance, has to be taken into account.

According to a further embodiment, both transverse control arm struts are rigidly connected to one another at their hub carrier ends, the transverse control arm being shaped as a triangular transverse control arm. Hence, both transverse control arm struts are connected to each other in such a way that they form an integral component. An integral component is made from one piece and cannot be separated in a non-destructive manner.

According to a further embodiment, the two transverse control arm struts have one of the at least three kinematic points at their connected hub carrier ends. This joint kinematic point of the two transverse control arm struts serves as the articulated connection of the transverse control arm to the wheel of the axle assembly if the transverse control arm is used in the axle assembly of a vehicle. This kinematic point may be shaped, for instance, as a swivel joint. The kinematic point of the transverse control arm struts at the hub carrier has a different spatial orientation from the two of the at least three kinematic points, which are arranged on the carriage ends of the transverse control arm struts. In other words, the axis of rotation of the kinematic point at the hub carrier is oriented, for instance, either perpendicular or obliquely to the axes of rotation of the kinematic points at the carriage.

According to a further embodiment, the transverse control arm is shaped as a divided transverse control arm, the transverse control arm having at least four kinematic points. Each of the two transverse control arm struts has one of the at least four kinematic points at its hub carrier end. In this case the first of the two transverse control arm struts has one of the at least four kinematic points at its hub carrier end. The second of the two transverse control arm struts has another of the at least four kinematic points at its hub carrier end. Each transverse control arm strut thus extends from a kinematic point at its hub carrier end to a kinematic point at its carriage end. Hence, the transverse control arm has at least four kinematic points. The transverse control arm struts are separated from each other at their hub carrier ends. Both transverse control arm struts are connected to the hub carrier independent from each other in an articulated manner by means of their respective kinematic points.

According to a further embodiment, each of the two transverse control arm struts has a curvature adapted to the installation space in a spatial direction, both transverse control arm struts being curved in the same spatial direction. Both transverse control arm struts, for instance, are shaped differently from each other, but they are curved in the same spatial direction. The first of the two transverse control arm struts has a first curvature having a first maximum. The second of the two transverse control arm struts has a second curvature having a second maximum.

Both transverse control arm struts may have the same curvature for instance. Alternatively, both transverse control arm struts may have a different curvature from each other. Identical curvatures have the same course of curvature viewed along the longitudinal extent of the transverse control arm strut from its hub carrier end to its carriage end. For instance, the maximum of the first transverse control arm strut may be located closer to the plane that the at least three kinematic points span than the maximum of the second transverse control arm strut. Of course, the maximum of the second transverse control arm strut may be located closer to the plane that the at least three kinematic points span than the maximum of the first transverse control arm strut. Due to the curved shape of both transverse control arm struts, each of the two transverse control arm struts can span at least one component of the axle arrangement.

An axle arrangement having a transverse control arm, which was described above, has a tie rod, which is guided in a partial area below the curvature adapted to the installation space of the at least one transverse control arm strut. A tie rod is defined as an element of a steering mechanism. It serves to transmit a steering torque to the hub carrier. During steering, the tie rod performs a translational movement and/or a displacement at least partially in the transverse direction of the vehicle. Hence steering has a component of movement of the tie rod, running in the transverse direction of the vehicle. The transverse direction of the vehicle is understood to mean a direction orthogonal to the vehicle longitudinal direction, which runs horizontally to the vehicle. The longitudinal direction of the vehicle coincides with the direction of travel when driving straight ahead.

In this case the tie rod is shaped according to custom and usage, for instance. The curvature adapted to the installation space of the at least one transverse control arm strut thus depends on the space requirement of the tie rod. In other words, the material-free area created by the curvature of the transverse control arm strut is oriented towards any movement that the tie rod can perform during a vehicle operating condition. The curvature is designed such that, for instance if the suspension of the tie rod is compressed, the latter cannot collide with the transverse control arm.

BRIEF DESCRIPTION OF THE DRAWINGS

An embodiment and details of the invention are described in detail, with reference to the figures explained below. In the drawings.

DETAILED DESCRIPTION OF THE PREFERRED EMBODIMENTS

Figure 1:
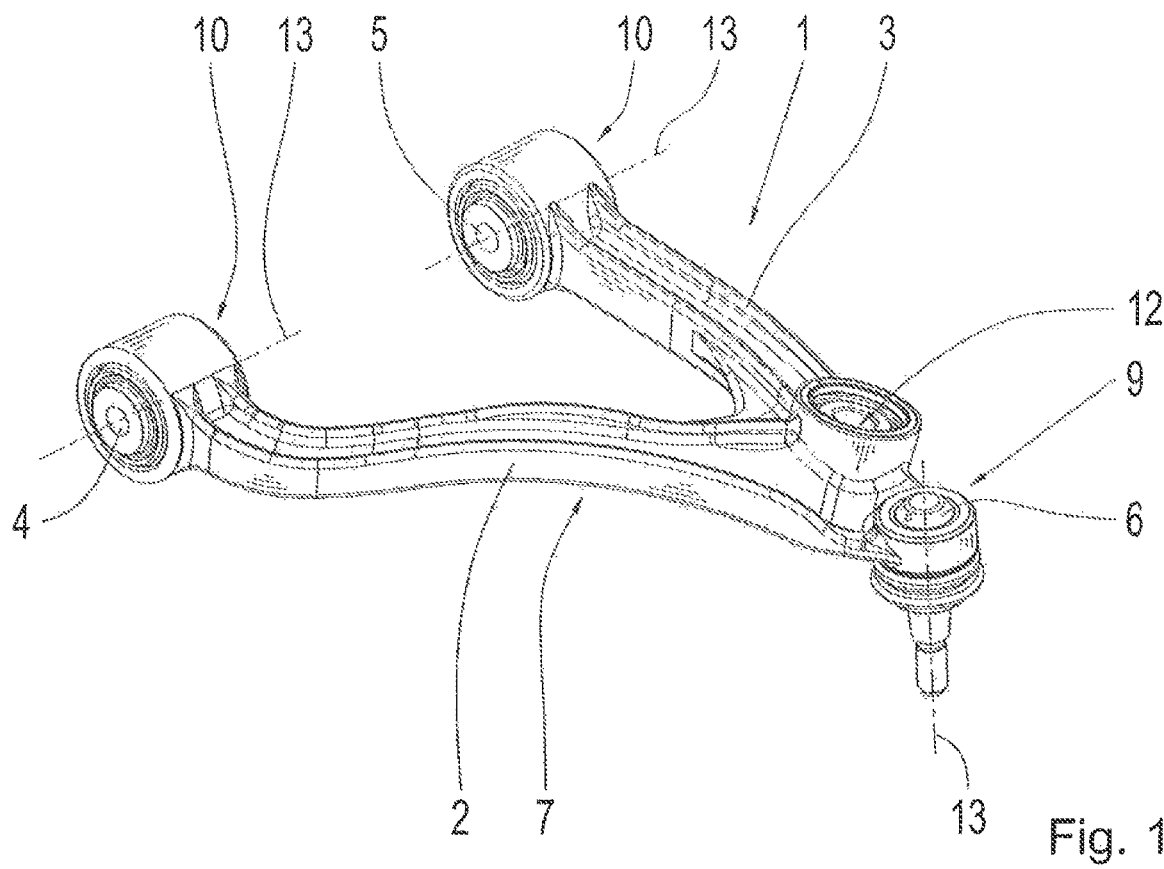
FIG. 1 shows a schematic representation of a transverse control arm having a curved transverse control arm strut according to an exemplary embodiment.

FIG. 1 shows a schematic representation of a transverse control arm 1 having a curved transverse control arm strut 2 according to an exemplary embodiment. The transverse control arm 1 has two mutually differently shaped transverse control arm struts 2, 3. A first transverse control arm strut 2 has a first carriage end 10. A second transverse control arm strut 3 has a second carriage end 10. Both transverse control arm struts 2, 3 are connected to each other at the hub carrier end. A carriage end 10 is supported by a vehicle carriage, for instance, when using the transverse control arm 1 in an axle assembly of a vehicle. A hub carrier end 9 is supported by a hub carrier of the axle assembly when using the transverse control arm 1 in an axle assembly of a vehicle. The first transverse control arm strut 2 is thus delimited by the first carriage end 10 and the hub carrier end 9. The second transverse control arm strut 3 is thus delimited by the second carriage end 10 and the hub carrier end 9. The transverse control arm 1 is shaped as a triangular transverse control arm.

The first transverse control arm strut 2 has a curvature 7. The second transverse control arm strut 3 is planarly shaped. The curvature 7 of the first transverse control arm strut 2 runs in a spatial direction, in this case in the direction of a vertical axis. The vertical axis is called a z-axis in a Cartesian coordinate system. In comparison to the second transverse control arm strut 3, which runs planarly in the direction of the vertical axis, i.e., has no curvature, crank or bend, the first transverse control arm strut 2 has a maximum in the direction of the vertical axis.

The transverse control arm 1 has three kinematic points 4, 5, 6. A kinematic point 4, 5, 6 in this case is that area of the transverse control arm 1, at which this transverse control arm can be connected to other components of the axle assembly and/or the vehicle in an articulated manner, when the transverse control arm 1 is used in the axle assembly of a vehicle. The first transverse control arm strut 2 has a first kinematic point 4 at its carriage end 10. The second transverse control arm strut 3 has a second kinematic point 5 at its carriage end 10. The first transverse control arm strut 2 and the second transverse control arm strut 3 have a third kinematic point 6 at their connected hub carrier end 9. The kinematic points 4 on the carriage-ends 10 of the two transverse control arm struts 2, 3 have the same orientation, i.e., the axes of rotation 13 of the articulated bearing are parallel to or coaxial with each other. The kinematic points 4, 5 on the carriage ends 10 of the two transverse control arm struts 2, 3 are located on the same plane in the design configuration shown here. The kinematic points 4, 5 on the carriage ends 10 of the two transverse control arm struts 2, 3 are designed as swivel joints.

The kinematic point 6 at the hub carrier end 9 of the transverse control arm 1 is oriented in a direction other than the kinematic points 4, 5, at the carriage ends 10. The axis of rotation 13 of this third kinematic point 6 at the hub carrier end 9 is oblique, i.e., skewed, to the axes of rotation 13 of the two kinematic points 4, 5 arranged on the carriage ends 10 of the transverse control arm struts 2, 3 and almost perpendicular to the plane, on which the first kinematic point 4 and the second kinematic point 5 are located. The third kinematic point 6 is shaped as a ball joint.

The three kinematic points 4, 5, 6 span a plane. The first transverse control arm strut 2 spans this plane. Owing to the material-free space created by the curvature 7 of the transverse control arm 1, a component of the axle assembly, for instance, can be arranged below this curvature 7, i.e., in the area that spans the curved transverse control arm strut 2. This is described in more detail in FIG. 2. Due to the curvature 7 of the first transverse control arm strut 2 the stability of the transverse control arm 2 is not adversely affected.

The transverse control arm 1 also has a coupling area 12. This coupling area 12 can be used to couple the transverse control arm 1 to a further component of the axle arrangement if the transverse control arm 1 is used in an axle arrangement of a vehicle.

Figure 2:
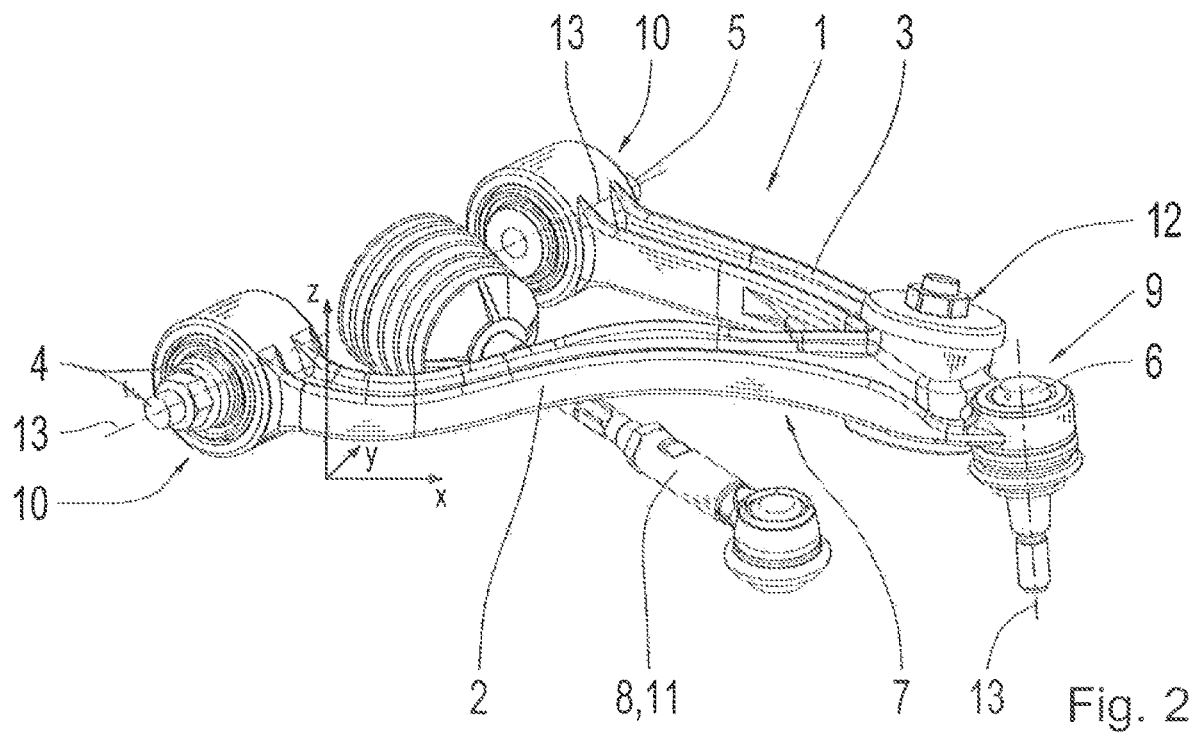
FIG. 2 shows a schematic representation of the transverse control arm having the curved transverse control arm strut according to the exemplary embodiment of FIG. 1 having a tie rod guided under the transverse control arm strut.

FIG. 2 shows a schematic representation of the transverse control arm 1 having the curved transverse control arm strut 2 according to the exemplary embodiment of FIG. 1 having a tie rod 11 guided under the transverse control arm strut 2. The tie rod 11 is a component 8 of an axle assembly in which the transverse control arm 1 is used. The transverse control arm 1 from FIG. 1 is shown in the design configuration. The tie rod 11 is arranged in a partial area beneath the first transverse control arm strut 2. In other words, the curvature 7 of the first transverse control arm strut 2 spans the tie rod 11 in a partial area.

During driving operation of the vehicle in which the transverse control arm 1 is used, the tie rod 11 can move, e.g., it can move downwards due to compression of the suspension. The material-free area created by the curvature 7 of the first transverse control arm strut 2, is designed such that upon movement of the tie rod 11 it does not collide with the first transverse control arm strut 2 and/or with any other elements of the transverse control arm 1. Neither does movement of the transverse control arm 1 result in a collision with the tie rod 11. In other words, the shape of the curvature 7 of the first transverse control arm strut 2 depends on the space requirement of the tie rod 11, which is spanned by the first transverse control arm strut 2 in a partial area, both in an equilibrium position and during a driving operation of the vehicle, in which the transverse control arm 1 is used in an axle assembly. Based on such an arrangement of the transverse control arm 1 and the tie rod 11 towards each other, the installation space available for the axle assembly space can be optimally used. The tie rod 11 and the transverse control arm 1 can be arranged close to each other. In comparison to a conventional transverse control arm 1, whose transverse control arm struts 2, 3 have no curvature 7, the existing installation space is utilized better and the required installation space is reduced.

The exemplary embodiments illustrated here were chosen only by way of example. For instance, instead of just the first transverse control arm strut, the second transverse control arm strut may also have a curvature in a spatial direction, i.e., in the direction of a vertical axis. The first and the second transverse control arm strut may have the same distance from their maximum to the plane that is spanned by the three kinematic points. Alternatively, the maxima of two transverse control arm struts may have a different distance from the plane spanned by the three kinematic points. For instance, a portion of another component of the axle assembly can be spanned by the first transverse control arm strut. For example, partial areas of a plurality of components of the axle arrangement can be spanned by the first transverse control arm strut and by the second transverse control arm strut if there are two curved transverse control arm struts. In addition, the transverse control arm may be shaped as a divided triangular transverse control arm. In this case, the first transverse control arm strut has a kinematic point at its carriage end and a further kinematic point at its hub carrier end, and the second transverse control arm strut has a kinematic point at its carriage end and a further kinematic point at its hub carrier end. Hence, the transverse control arm has four kinematic points. In addition, the kinematic points can be formed by joints other than swivel joints.

1 transverse control arm
2 first transverse control arm strut
3 second transverse control arm strut
4 first kinematic point
5 second kinematic point
6 third kinematic point
7 curvature
8 component
9 carrier hub end
10 carriage end
11 tie rod
12 coupling area
13 axis of rotation

The invention claimed is:

1. A single transverse control arm of an axle arrangement for a vehicle, the single transverse control arm comprising:
   first and second transverse control arm struts
   at least three kinematic points,
   each of the first and the second transverse control arm struts having a hub carrier end and a carriage end,
   the first transverse control arm strut having a curvature in a spatial direction that is different than a curvature of the second transverse control arm strut in the spatial direction, and
   the spatial direction being a vertical axis that is perpendicular to a plane spanned by the at least three kinematic points.

2. The transverse control arm according to claim 1, wherein each of the first and the second transverse control arm struts has one of the at least three kinematic points at the carriage end thereof.

3. The transverse control arm according to claim 1, wherein a shaping of the curvature of the first transverse control arm strut is determined by an installation space requirement of a component of the axle arrangement, and the component is guided in an area below the curvature of the first transverse control arm strut.

4. The transverse control arm according to claim 1, wherein the hub carrier ends of the first and the second transverse control arm struts are rigidly interconnected with one another, and the transverse control arm is shaped as a triangular transverse control arm.

5. The transverse control arm according to claim 4, wherein both of the first and the second transverse control arm struts have one of the at least three kinematic points at the interconnected hub carrier ends.

6. The transverse control arm according to claim 1, wherein both of the first and the second transverse control arm struts are curved in the same direction in space.

7. The transverse control arm according to claim 1, wherein the curvature of the first transverse control arm strut in the spacial direction is greater than the curvature of the second transverse control arm strut in the spacial direction.

8. The transverse control arm according to claim 7, wherein each of the first and the second transverse control arm struts having a maximum, the maximum being defined as a maximum distance between the plane and an area of the first and the second transverse control arm struts, respectively, and the maximum of the first transverse control arm strut being greater than the maximum of the second transverse control arm strut.

9. The transverse control arm according to claim 1, wherein the at least three kinematic points comprise first, second and third kinematic points,
   the carriage ends of the first and the second transverse control arm struts comprise the first and the second kinematic points, respectively, for connecting the transverse control arm to a vehicle carriage,
   the hub carrier ends of the first and the second transverse control arm struts comprise the third kinematic point in common for connecting the transverse control arm to a component of an axle assembly, and
   transverse control arm further comprising a coupling area for coupling the transverse control arm to another component of the axle assembly.

10. The transverse control arm according to claim 9, wherein the first and the second kinematic points are swivel joints and the third kinematic point is a ball joint.

11. An axle arrangement in combination with a transverse control arm for a vehicle, the transverse control arm comprising:
   first and second transverse control arm struts,
   at least three kinematic points,
   each of the first and the second transverse control arm struts having a hub carrier end and a carriage end,
   the first transverse control arm strut having a curvature in a spatial direction that is different than a curvature of the second transverse control arm strut in the spatial direction,
   the spatial direction being a vertical axis that is perpendicular to a plane spanned by the at least three kinematic points, and
   the axle arrangement having a tie rod which is guided in a partial area below the curvature of the first transverse control arm strut.

12. A single transverse control arm of an axle arrangement for a vehicle, the single transverse control arm comprising:
   first and second transverse control arm struts,
   at least three kinematic points with the at least three kinematic points defining a plane,
   each of the first and the second transverse control arm struts having a hub carrier end and a carriage end,
   the second transverse control arm strut being planar and the first transverse control arm strut having a curvature in a spatial direction, and
   the spatial direction being a vertical axis that extends perpendicular relative to the plane defined by the at least three kinematic points.

* * * * *